Patented Sept. 20, 1949

2,482,724

UNITED STATES PATENT OFFICE 2,482,724

DEOXYGENATION PROCESS

Dwight L. Baker, Chicago, Ill., assignor to Ben L. Sarett, Chicago, Ill.

No Drawing. Application July 22, 1944, Serial No. 546,214

13 Claims. (Cl. 99—186)

This invention relates to a method of and means for protecting substances from the deleterious action of free oxygen.

It is known that a large number of industrial products are adversely affected by free oxygen in solution with the product. Bottled beer, which contains free or molecular oxygen in solution and/or oxygen in the space above the top surface of the beer, is subject to an objectionable action resulting in, amongst other things, cloudiness of the beer. Apple cider, orange juice, and other fruit juices that are to be canned are adversely affected by free oxygen. The same is true of canned vegetables, such as asparagus, peas, corn and the like, of canned milk and a large number of other industrial products.

In many products where free oxygen in solution is responsible for an objectionable action taking place, there are present other substances which would produce no objectionable effects if oxidized to the extent possible by the limited amount of oxygen available. These other substances are, however, resistant to oxidation under the prevailing conditions. By the addition of a proper enzyme (an oxidase) the rate of oxidation of such substance or substances can be so greatly increased that the available oxygen is entirely consumed by them. The enzyme acting as a catalyzer thus directs the oxidation to a predetermined constituent part of the product, thus protecting from oxidation those other ingredients of the product which, if oxidized, produce the deleterious effects.

In a product that has been put into a sealed container the amount of free oxygen present is limited to the amount in solution plus the amount contained in the air above the product. If that limited amount of oxygen is consumed in a harmless manner there will be none left to injure the product. A combination of enzymes may be used which will catalyze the oxidation of a substance already present in the product to thereby consume the available free oxygen in a harmless way and prevent the oxygen from combining with other ingredients of the product to produce harmful effects. An enzyme is known as an oxidase if it catalyzes the reaction between molecular or free oxygen and some specific substance, with or without the production of hydrogen peroxide. The specific substance the oxidation of which is catalyzed by the oxidase is known as a substrate for the oxidase.

In some instances it is better to produce in the product a substrate for the oxidase that is to be introduced rather than to use a substrate already present. By way of example, if glucose is necessarily present in the product to be protected from the harmful effects of free oxygen, then an enzyme can be provided to cause some of the glucose to oxidize, with the ultimate production of gluconic acid and other products, the amount of gluconic acid produced being determined by the amount of free oxygen present. If glucose is not present in the original product but if there is present another ingredient, such as maltose, sucrose, lactose or starch, additional enzymes may be introduced which will cause one of the last named products which is present to hydrolyze to produce glucose, which can then be caused to oxidize in the same manner as above set forth.

The present invention contemplates the use of an oxidase as a catalyzer to combine the oxygen with some substance in the product in a harmless way. If one of the results of the oxidation is the production of an objectionable ingredient, then an additional enzyme may be introduced which catalyzes the action of the harmful by-product to produce a harmless product.

The principles of the present invention may be applied wherever there is present or can be produced a substrate for one of the known oxidases. Table I below indicates some of the different oxidases that may be used with corresponding substrates. The substrates may be those inherently present in the product or may be those which are readily produced by the catalytic action of other enzymes on ingredients in the product.

Table I

| | Oxidase | Substrate |
|---|---|---|
| 1 | tyrosinase | phenols and catechols. |
| 2 | aldehyde oxidase | aldehydes and purines. |
| 3 | amino acid oxidase | amino acids. |
| 4 | uricase | uric acid. |
| 5 | glucose oxidase | glucose, mannose, galactose. |
| 6 | amine oxidase | mono and di-amines. |
| 7 | lip-oxidase | unsaturated fatty acids. |
| 8 | ascorbic oxidase | vitamin C. |

If the product to be protected from the deleterious action of the free oxygen contains one or more of the substrates of Table I above, the oxidizing action of that substrate can be catalyzed by introducing into the product very small amounts of the corresponding oxidases set forth in the same table. Under the catalytic action of the oxidase the substrate unites with the free oxygen present in solution in the product. As the oxygen in solution is being consumed more and more of the free oxygen of the confined air above the product in the sealed container goes into solution and is thus likewise consumed until all of the free oxygen in the container with the product has been consumed. In many cases the oxidation of a substance by molecular or free oxygen in aqueous solution results in partial reduction of the oxygen molecule giving rise to the production of hydrogen peroxide in accordance with the equation (1) $\quad 2G+2O_2+2H_2O=GO+2H_2O_2$ wherein "G" represents the substrate being oxidized. This is true of the oxidases numbered 2, 3, 4, 5 and 6 of Table I. Hydrogen peroxide is a good oxidizing agent and its production as a by-product of the reaction set forth in Equation 1 above is just as objectionable, or even more so, than is the original molecular oxygen. The objections inherent in the production of hydrogen peroxide, as set forth in Equation 1 above, can be overcome if means is provided to consume the hydrogen peroxide the instant that it is produced. In accordance with the present invention there is therefore introduced another respiratory enzyme, to-wit, catalase, which is an ideal catalyzer for causing the break down of hydrogen peroxide as soon as it is formed. This reaction takes place in accordance with the following equation:

(2) $\quad 2H_2O_2+\text{catalase}=2H_2O+O_2+\text{catalase}$

It will be observed, therefore, that upon adding Equation 1 with Equation 2 half of the oxygen involved has been consumed and all of the catalyzer remains. The reaction is therefore repeated continuously, the free oxygen present being reduced each time, thereby the free oxygen present rapidly approaches zero.

In many types of oxidation reactions which do not involve the use of an oxidase one of the products formed is hydrogen peroxide, which is objectionable. Thus, for instance, when ascorbic acid or iso-ascorbic acid is oxidized hydrogen peroxide is formed which is just as objectionable, or even more so, as the original molecular oxygen. This is true in the use of ascorbic acid for consuming the free oxygen in packaged beer as set forth, for instance, in United States Patent No. 2,159,985. In accordance with the present invention the oxidizing advantages of the ascorbic acid or other oxidizing agents may be retained and the disadvantages of the resulting hydrogen peroxide may be avoided by adding the enzyme catalase to the solution so that the instant the hydrogen peroxide is formed the catalase causes it to break down into water plus half as much oxygen as entered into the reaction. In accordance with the present invention catalase may be used to effect a consumption of the hydrogen peroxide even though the hydrogen peroxide was formed by an action other than one involving an oxidase.

It may happen that there is no substrate for an available oxidase in a product. For instance, there is little or no glucose in beer, and glucose oxidase would not find a substrate if added to beer. Such a situation may, however, be dealt with either by adding a sugar which is substrate for glucose oxidase or, better still, if there is present a condensation product of the substrate, adding an enzyme to catalyze a reaction of the condensation product to produce the substrate. Thus in the example of beer which contains no glucose, maltose is present. By the addition of maltase (to beer) the maltose is caused to be hydrolyzed into glucose, which in turn will act as a suitable substrate for glucose oxidase.

Other condensation products which may be hydrolyzed by the catalytic action of an appropriate enzyme to give substrates listed in Table I and the enzymes which catalyze the hydrolysis are given in Table II.

*Table II*

| Condensed Product | Enzyme | Substrate, Table I |
|---|---|---|
| maltose | maltase | glucose. |
| sucrose | invertase | Do. |
| lactose | lactase | Do. |
| protein | protease | amino acids. |
| starch | diastase and maltase | glucose. |
| oils | lipase | unsaturated fatty acids. |

The present invention is applicable for de-oxygenating fruit juices, particularly orange and other citrus fruit juices, tomato juice and the like, ciders and the like.

The appropriate enzyme can be incorporated in pellets, which include other ingredients that are necessarily added to the product being canned. For instance, in the canning of vegetables a salt pellet (sodium chloride) is introduced into each can. The dry salt pellet can originally be made to include the necessary enzymes so that the enzymes are introduced by the introduction of the salt pellet.

I will give a number of examples of the application of the present invention to different products:

*Example 1.*—The removal of free oxygen from beer that has been or is being chill-proofed by the use of an enzyme chill-proofing compound free of peroxidase activity. Add to the beer at the commencement of, during or at the completion of the chill-proofing a mixture of the following three enzymes: Maltase, glucose oxidase and catalase in the amount of approximately one pound of the enzyme compound to one hundred barrels (each containing 31 gallons) of beer. The following reactions take place:

1. 1 molecule maltose in the presence of the enzyme maltase hydrolyzes to produce 2 molecules of glucose.

2. 2 molecules of glucose plus 2 molecules of oxygen plus two molecules of water unite in the presence of glucose oxidase to produce 2 molecules of gluconic acid plus 2 molecules of hydrogen peroxide.

3. 2 molecules of hydrogen peroxide in the presence of the enzyme catalase produce 2 molecules of water plus 1 molecule of oxygen. Thus 1 molecule of maltose of Equation 1 plus 2 molecules of oxygen of Equation 2 are ultimately converted into 2 molecules of gluconic acid plus 1 molecule of oxygen. The cycle repeats itself, each time reducing the amount of oxygen 50%, so that the quantity of oxygen remaining rapidly approaches zero.

*Example 2.*—In dealing with a substance that does not contain maltose but contains sucrose, such as, for instance, orange juice, add to the orange juice glucose directly, or the enzyme invertase, sometimes also known as sucrase. In addition add glucose oxidase, plus catalase. The sucrose, in the presence of the catalyzer invertase, is hydrolyzed to form glucose and fructose. The glucose then follows Equations 2 and 3 of Example 1 under the action of the glucose oxidase and catalase, respectively.

*Example 3.*—In dealing with milk, which does not contain sucrose but does contain lactose, the enzyme lactase is substituted for the enzyme maltase of Example 1. The lactose causes the hydrolysis of the lactose to glucose, plus galactose, both of which are substrates for glucose oxidase. The glucose oxidase and the catalase then act as in Example 1, to-wit, the glucose and galactose are oxidized in the presence of the glucose oxidase as a catalyzer, in accordance with Equation 2 of Example 1, and the hydrogen peroxide is destroyed by the catalytic action of the catalase as set forth in Example 1.

*Example 4.*—If the product to be preserved contains starch there is added the enzyme of Example 1 plus the additional enzyme diastase. Some starch is hydrolyzed by the diastase to produce maltose, which is then acted upon by the maltase and other enzymes as in Example 1.

From the above description it is apparent that to deoxygenate any product which contains a substrate set forth in Table I, it is merely necessary to add the corresponding enzyme oxidase of that table. In the event that one of the by-products of the reaction is objectionable, such as hydrogen peroxide, it is merely necessary to add, in addition, catalase, which reduces the hydrogen peroxide the instant that it is formed. In the event that the product does not contain a substrate such as set forth in Table I, then it is merely necessary to add some enzyme which will catalyze the action of an ingredient or ingredients in the product to form a substrate of the type set forth in Table I. All of the enzymes that are to be added may be added at the same time.

In dealing with a product that is to be pasteurized, such as beer, milk or the like, it is necessary to consider whether or not the pasteurization temperature is above the temperature destructive of the enzymes. If it is above that temperature then the deoxygenation process must be carried out prior to the pasteurization. In the case of beer, which may be pasteurized at 60° C., the temperature is not above that destructive of the action of the enzymes and therefore the enzymes may be added at any time up to the time of sealing of the container in which the product is packaged.

Since glucose, mannose and galactose are the most common substrates present, or the most easily produced, the enzyme glucose oxidase together with the catalase are the most frequently used. I have found that one ounce of a maltase containing preparation, such as the preparation known as "Clarase" (Takamine Laboratories, Inc.), can catalyze the hydrolysis of enough maltose to glucose so that the quantity of glucose produced is sufficient to deoxygenate 100 barrels (31 gallons each) of water or other liquor to be deoxygenated. Glucose oxidase and catalase can be produced simultaneously. I have found that four ounces, on a solids basis, of a glucose oxidase and catalase preparation, of a concentration that results from the preparation of an enzyme in the manner below set forth, is sufficient to deoxygenate 25,000 pounds of water. The enzyme preparation containing glucose oxidase and catalase may be prepared in the following manner:

The following medium is prepared for inoculation with spores from a test tube culture of "*Penicillium chrysogenum.*"

Medium A

| | | |
|---|---|---|
| Cerelose (dextrose) | g | 50 |
| $MgSO_4 \cdot 7H_2O$ | | 120 |
| $KH_2PO_4$ | mg | 140 |
| $(NH_4)_2SO_4$ | mg | 560 |
| $Na_2HPO_4$ | mg | 600 |
| Peptone | mg | 200 |
| Agar | g | 20 |
| Beer | cc | 45 |
| Distilled water to | cc | 1000 |

The medium is heated to dissolve the agar and then 200 cc. thereof is poured into one-liter bottles. The mouth of each bottle is plugged with cotton and the bottles sterilized at 15 pounds gauge pressure for 20 minutes. The bottles are then laid on their sides to cool. Into this cooled medium the spores of a test tube culture of "*Penicillium chrysogenum*" are inoculated and the culture incubates for seven days at 30° C.

Medium B is then made up as follows:

Medium B

| | | |
|---|---|---|
| Malt syrup | g | 200 |
| $MgSO_4 \cdot 7H_2O$ | mg | 250 |
| $KH_2PO_4$ | mg | 180 |
| $Na_2HPO_4$ | mg | 380 |
| $NaNO_3$ | g | 1.46 |
| Tap water to | cc | 1000 |

Sterilize for 20 minutes at 15 pounds gauge steam pressure. Place 250 cc. of sterile medium B in a flask and then inoculate the same with 1/12 of the culture that was incubated in medium A. This is accomplished by suspending the spores of the mold incubated on medium A in sterile water and adding this spore suspension to the culture flask of medium B.

The mold is allowed to grow on medium B for seven days. It is then harvested, washed well for about one hour with several changes of tap water and then freed of excess water by squeezing it in a cheesecloth bag. This mold is next ground with equal parts by weight of Berkshire sand and $\frac{3}{10}$ gram of infusorial earth per gram of mold. The grinding is performed in a mortar for approximately 20 minutes or until the mixture becomes wet and sticky.

The ground mold is next mixed with 0.1 M. of $Na_2HPO_4$ solution (two cubic centimeters for each gram of mold). The mixture is left to stand for about an hour with occasional stirring and is then filtered, the insoluble pad being then washed with more of the same solution. The filtrate is then dialyzed against distilled water at about 5° C. to give the final enzyme preparation.

The enzyme preparation contains about 3 milligrams of solids per cubic centimeter. Four ounces of this preparation, on a solids basis, has been found sufficient to protect 100 barrels (each 31 gallons) of beer from the deleterious action due to oxygen. The mold may be grown successfully on dextrose in place of the syrup in medium B.

"*Penicillium chrysogenum*" is not the only spore that may be used in the above medium. In lieu thereof there may be used spores of molds such as *Aspergillus niger*, *Penicillium purpurogenum*, *Aspergillus fumaricus* and *Penicillium glaucum*. Spores of the above mentioned molds may be substituted for the culture of "*Penicillium chrysogenum*" above set forth.

It is to be noted that the enzymes produced by the process above set forth are the internal enzymes, that is, the entire mold is used as distinguished from using merely the external secretions of the mold.

The enzymes used, as hereinabove set forth, may be introduced into the medium to be deoxygenated alone or together with other ingredients that are to be added to the product. In some canning processes, particularly for the canning of vegetables such as tomatoes, corn, peas, asparagus, etc., it is customary to introduce a pellet of salt (sodium chloride) of a proper weight into each can. The enzymes in proper proportions can be mixed with the salt that is to be used. If the salt is pressed into pellets each pellet will then contain traces of the enzymes that have been introduced, the amount of the enzymes in each pellet being in the quantities necessary to deoxygenate a can of the product into which the pellet is to be introduced.

In many instances it is desirable to remove the free or molecular oxygen from a solution which does not contain any of the substrates of Table I or any of the condensation products of Table II. When that is the case the product may be deoxygenated by adding thereto one of the substrates of Table I and a corresponding oxidase. In most instances glucose is a suitable substrate to add, since the by-product is the generally harmless ingredient gluconic acid. Wherever glucose is to be oxidized by the catalytic action of glucose oxidase there is also included the enzyme catalase to reduce the hydrogen peroxide formed. The same applies when the product is deoxygenated by a substrate and oxidase such as set forth in cases 2, 3, 4, 5 and 6 of Table I. The amount of substrate that is to be added is exceedingly small. For instance, to deoxygenate approximately 100 barrels (each of 31 gallons capacity) of oxygen saturated water it would require an amount of the order of one pound of glucose. If this is increased fivefold, in order to speed up the rate of the reaction, the total amount of glucose added is still a negligible proportion of the total amount of weight of water deoxygenated. As a result only imperceptible traces of gluconic acid are produced in the water. The amount of glucose oxidase and catalase added is only a fraction of a pound per hundred barrels of water. The advantage of this method of deoxygenating over deoxygenation by introducing into the water a chemical reducing agent lies in the fact that the substrate together with its oxidase constitute a reducing means specific for free oxygen and will not reduce any of the other ingredients of the water or other liquor being deoxygenated, or of the product in which the liquor is ultimately used. With other chemical reducing agents which are not specific for free or molecular oxygen an excessive amount of the reducing agent will be available for reducing other compounds present in the solution or present in the product in which the deoxygenated solution is ultimately used.

The source of glucose, when glucose is used as hereinabove set forth, is the commercial product known as "Dextrose," the two being interchangeable.

Many micro-organisms which are responsible for the spoilage of products require free or molecular oxygen for their growth. If deprived of all or most of the free oxygen the multiplication of the organisms is either stopped or inhibited, with the result that spoilage is either prevented or appreciably slowed down. As a result the shelf life of the product is increased. In some instances the addition of the enzymes hereinabove set forth will so retard the growth of those micro-organisms which are responsible for spoilage of the product, that pasteurization which was heretofore necessary in the particular case is rendered unnecessary.

In compliance with the requirements of the patent statutes I have here described a few preferred embodiments of my invention. It is, however, to be understood that the invention is not limited to the precise examples given, the same being merely illustrative of the principles of the invention.

What I consider new and desire to secure by Letters Patent is:

1. The method of removing free oxygen from food wherein said oxygen is dissolved, which comprises incorporating in said food a stoichiometric excess of glucose, glucose oxidase, and catalase, and maintaining said food below 60° C. until said oxygen is consumed.

2. The method of destroying free oxygen dissolved in food containing aqueous liquid and a disaccharide, which comprises adding thereto catalase, glucose oxidase, and an enzyme effective to generate glucose from said disaccharide.

3. The method of preparing a stable package of food containing aqueous liquid and a substance capable of being enzymatically converted to glucose, which comprises adding to said food catalase, glucose oxidase, and an enzyme which converts said substance into glucose, and thereafter hermetically sealing said food in a container at a temperature below about 60° C., thereby eliminating uncombined oxygen from said package.

4. A packaged food free of uncombined oxygen, comprising food containing aqueous liquid and glucose, glucose oxidase, and catalase hermetically sealed in a container, the amounts of said glucose, glucose oxidase, and catalase being respectively in stoichiometric excess of the quantity of uncombined oxygen originally present in said food and in said container.

5. The method of removing free oxygen from a solution which contains a substrate capable of being enzymatically oxidized, which comprises adding to said solution catalase and an enzyme oxidase specific for said substrate.

6. An article of manufacturing comprising a hermetically sealed container containing orange juice and glucose, glucose oxidase, and catalase to completely eliminate uncombined oxygen from said juice and container.

7. A package stabilized against oxidative deterioration, comprising a sealed container having enclosed therein a solution which is normally subject to oxidative deterioration, a substrate capable of being enzymatically oxidized, catalase, and an enzyme oxidase specific for said substrate, the amounts of said catalase and of said oxidase each being in stoichiometric excess of the uncombined oxygen originally present in said package.

8. A stable package of food comprising a hermetically sealed container containing aqueous food; a substance capable of being enzymatically converted to glucose; the enzymes catalase, glucose oxidase, and an enzyme which converts said substance into glucose; the amounts of said enzymes being sufficient to effect elimination of all the uncombined oxygen originally present in said package of food.

9. A packaged food stabilized against oxidative deterioration, comprising a hermetically sealed container containing a potable liquid normally subject to oxidative deterioration, and sufficient glucose, glucose oxidase, and catalase to substantially completely eliminate uncombined oxygen from said packaged food.

10. An article of manufacture comprising a hermetically sealed container containing a fruit juice and sufficient glucose, glucose oxidase, and catalase to completely eliminate uncombined oxygen from said juice and container.

11. An article of manufacture comprising a hermetically sealed container containing a citrus fruit juice and sufficient glucose, glucose oxidase, and catalase to completely eliminate uncombined oxygen from said juice and container.

12. A canned vegetable stabilized against oxidative deterioration, comprising a hermetically sealed container containing aqueous liquid, a vegetable, and sufficient glucose, glucose oxidase, and catalase to completely eliminate uncombined oxygen from said container and the contents thereof.

13. Canned peas stabilized against oxidative deterioration, comprising a hermetically sealed container containing aqueous liquid, peas, and sufficient glucose, glucose oxidase, and catalase to completely eliminate uncombined oxygen from said container and the contents thereof.

DWIGHT L. BAKER.

REFERENCES CITED

The following references are of record in the file of this patent:

UNITED STATES PATENTS

| Number | Name | Date |
|---|---|---|
| 732,083 | Jones | June 30, 1903 |
| 1,065,575 | Yenjo | June 24, 1913 |
| 1,715,932 | Kokatnur | June 4, 1929 |
| 1,882,112 | Boidin | Oct. 11, 1932 |
| 2,077,448 | Wallerstein | Apr. 20, 1937 |
| 2,102,315 | Grassman et al. | Dec. 14, 1937 |
| 2,159,985 | Gray | May 30, 1939 |
| 2,282,492 | Mujamoto | May 12, 1942 |

Certificate of Correction

Patent No. 2,482,724 — September 20, 1949

DWIGHT L. BAKER

It is hereby certified that errors appear in the printed specification of the above numbered patent requiring correction as follows:

Column 3, line 68, before the word "substrate" insert *a*; column 5, line 3, for "lactose" read *lactase*; line 50, before "catalase" strike out "the"; lines 68 and 69, strike out the quotation marks before and after "Penicillium chrysogenum."; column 6, lines 12 and 13, line 59, and lines 65 and 66, strike out the quotation marks before and after "Penicillium chrysogenum"; column 5, line 73, in the table, for "_____ 120" read _____ *mg*\_\_*120*; column 6, lines 62 and 63, for "*Aspergillus*" read *Aspergilus*; column 8, line 41, for "manufacturing" read *manufacture*;

and that the said Letters Patent should be read with these corrections therein that the same may conform to the record of the case in the Patent Office.

Signed and sealed this 28th day of February, A. D. 1950.

[SEAL]

THOMAS F. MURPHY,
*Assistant Commissioner of Patents.*